United States Patent [19]

Weinert

[11] 4,340,970

[45] Jul. 20, 1982

[54] POWER WHEEL

[76] Inventor: Friedrich Weinert, 219-19 131st Ave., Jamaica, N.Y. 11413

[21] Appl. No.: 156,419

[22] Filed: Jun. 4, 1980

[51] Int. Cl.³ .............................................. G21C 00/00
[52] U.S. Cl. .................................... 376/208; 376/912; 376/910; 376/911; 376/317
[58] Field of Search ....................... 176/28, 29, 39, 45, 176/46 DIG. 1, DIG. 2; 175/5, 6, 10; 376/208, 910, 911, 912, 317

[56] References Cited

U.S. PATENT DOCUMENTS

| | | | |
|---|---|---|---|
| 2,747,105 | 5/1956 | Fitzgerald et al. | 176/DIG. 2 |
| 2,812,304 | 11/1957 | Wheeler | 176/DIG. 1 |
| 3,309,622 | 3/1967 | Weiner et al. | 176/DIG. 1 |
| 3,543,036 | 11/1970 | Majkrzak | 176/39 |
| 3,547,778 | 12/1970 | Flaherty et al. | 176/39 |
| 3,549,490 | 12/1970 | Moore | 176/39 |
| 3,604,519 | 9/1971 | Chelminski | 175/6 |
| 3,714,996 | 2/1973 | Dane, Jr. | 175/6 |
| 3,812,922 | 5/1974 | Stechler | 175/6 |
| 4,050,252 | 9/1977 | Nakanishi | 176/39 |

FOREIGN PATENT DOCUMENTS 1428713  1/1966  France ..................... 176/DIG. 1

Primary Examiner—Sal Cangialosi

[57] ABSTRACT

Power wheel comprises a heat engine consisting of several expansion valves rigidly situated around the circumference of a stationary side gear and centralized to a axis which rotates through the work out put by expanding a fluid centralized inside a valve unit by a heat source operating in intervals introduced through the rotation of the expansion valves by moving a valve plunger in or out of the heat elements which in return will expand or contract a fluid, to move push rods stroke wise in both directions to activate a spindle drive by rotating a pinion gear with ratchet units to achieve rotation in one direction.

4 Claims, 11 Drawing Figures

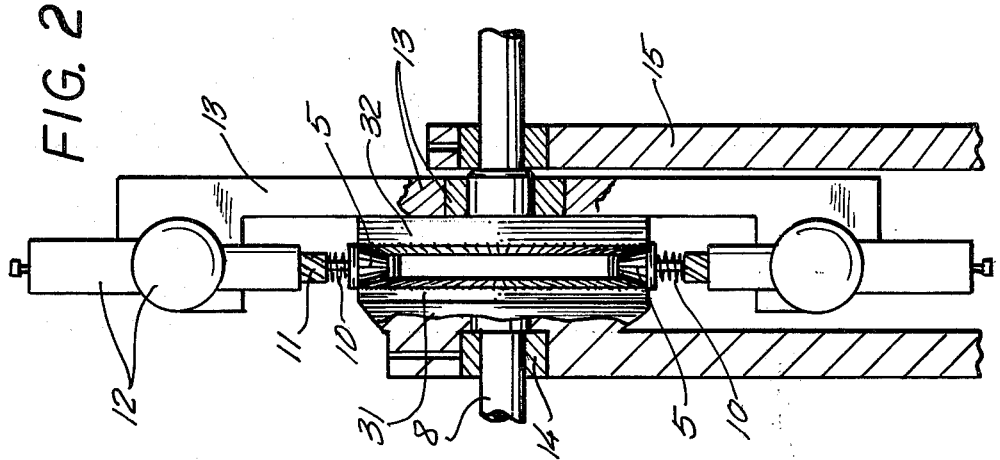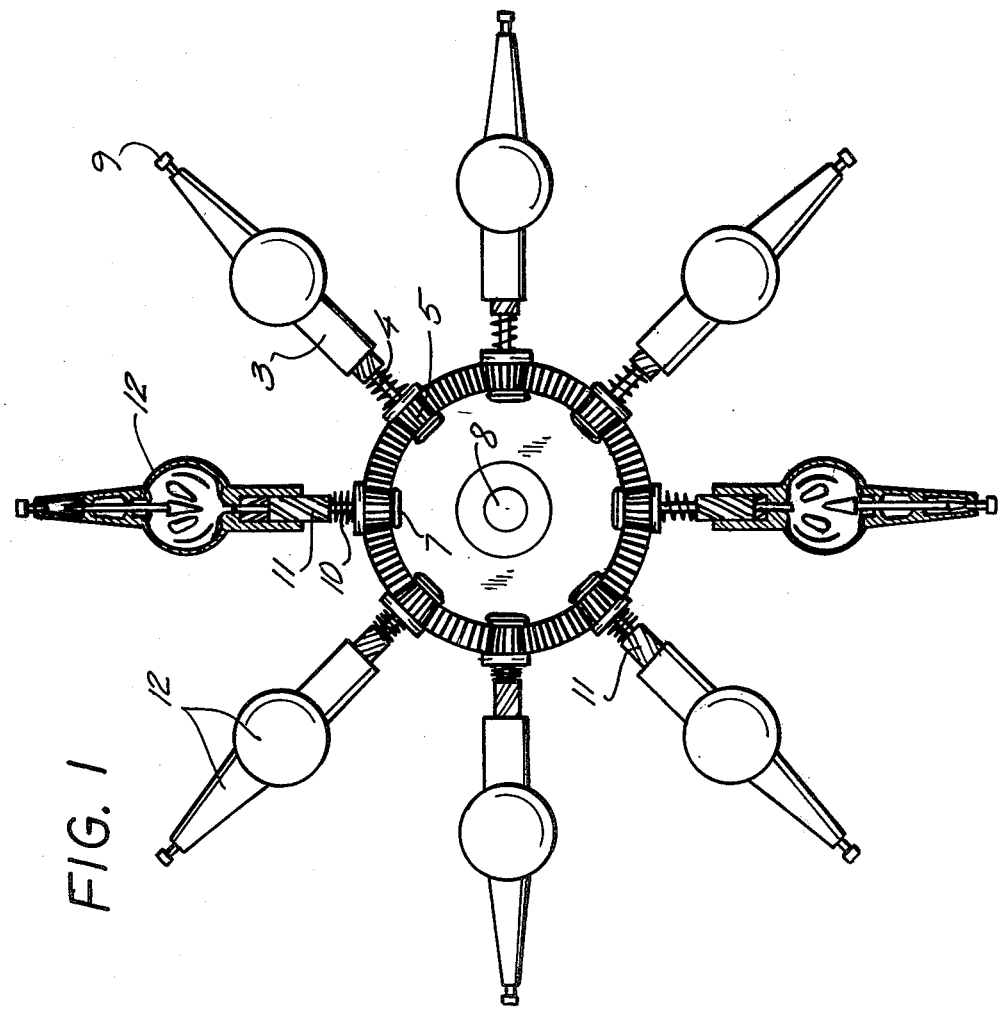

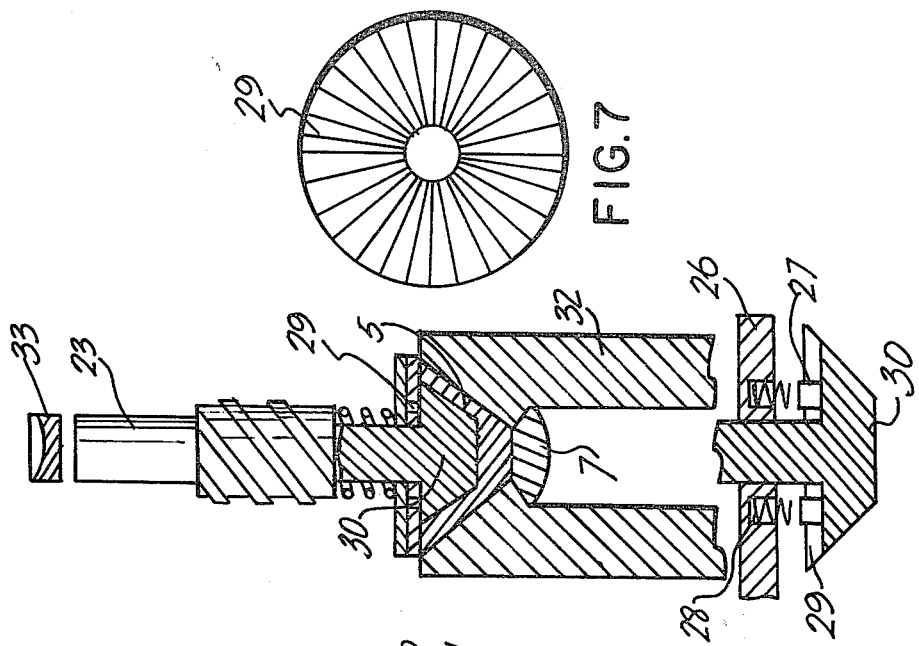
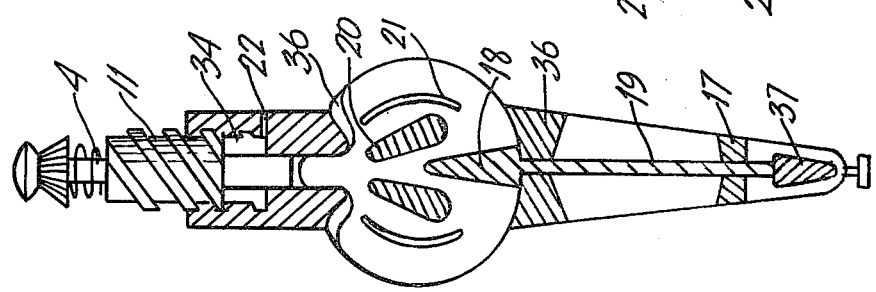
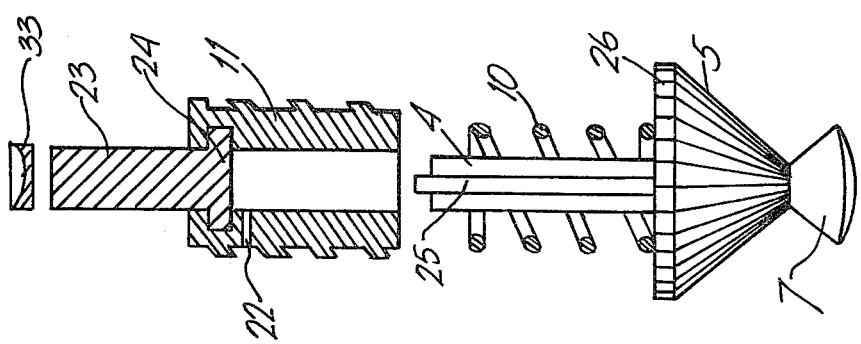
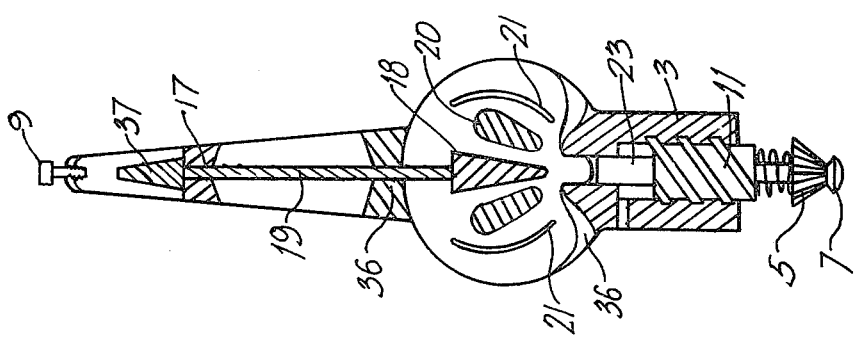

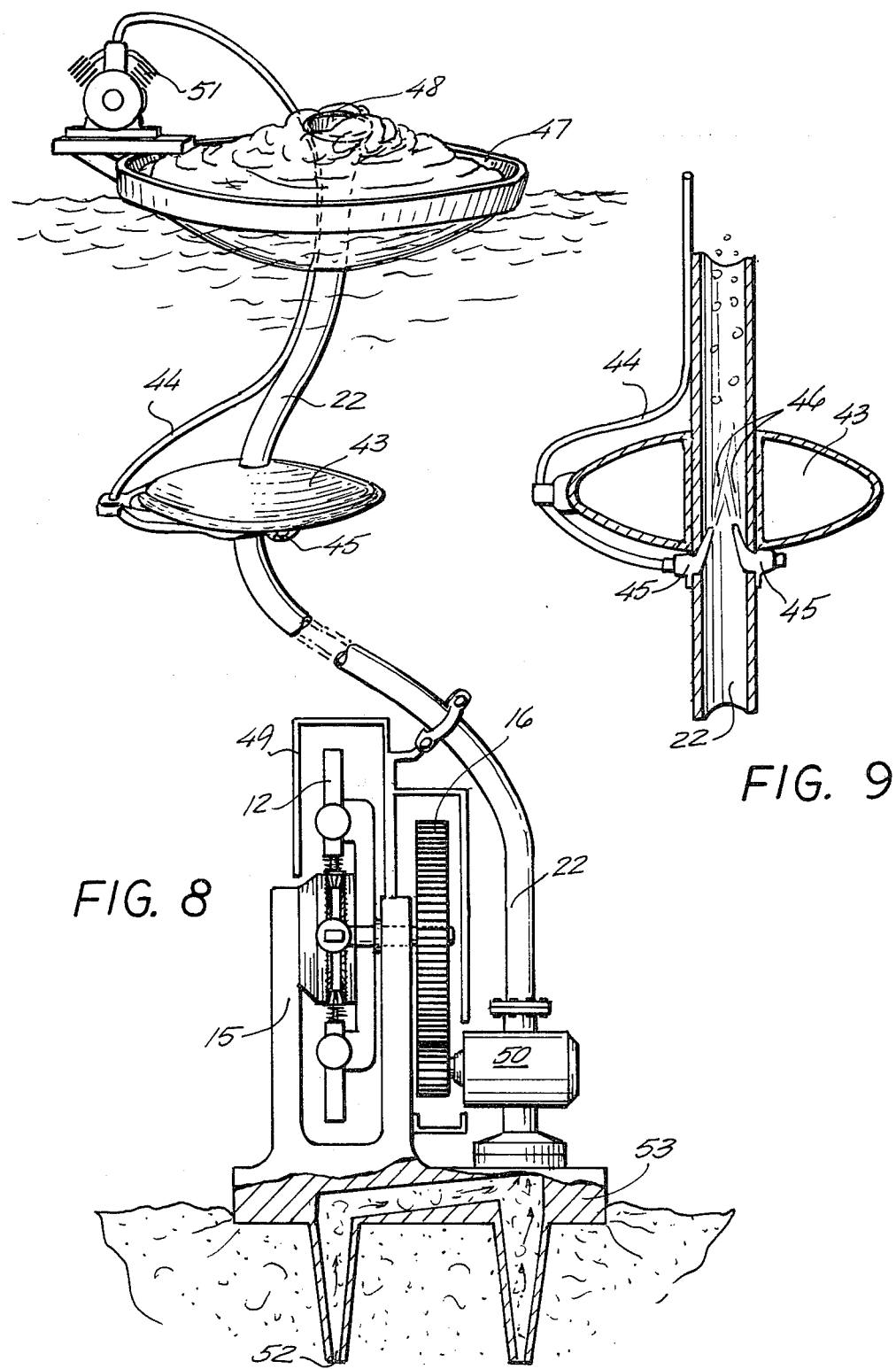

POWER WHEEL

SUMMARY OF THE INVENTION

This invention relates to a power drive activated through several expansion valves which are installed around a drive shaft. The expansion valves consisting of hollow cylinders made of a good heat transmitting material such as stainless steel joined in a ceramic body with push rod and pushrod cylinder at the very end. The inside of the expansion valve is completely filled with expansible liquid, so any temperature difference penetrating the heat collector from the inside or outside of the valve will expand or contract. Inside the valve the liquid which will in return push the pushrod in or out the valve unit. The pushrod is connected to a spindle drive and ratched gear in such a way that the downstroke will push the spindle through a spindle thread and drive a pinion gear. Inside the pinion gear is a ratched gear installed which will disengage the spindle drive on the back stroke. The pinion gear is connected to the spindle drive through a stud sliding bushing and key inside the spindle drive. The pinion gear will drive the big wheel around a side gear which is fastened against the stand. A second side gear called satellite gear which runs free are connected to the driveshaft. The functioning of the satellite gear is to keep the pinion gear against the side gears, the pinion gear is also secured through a sliding collar on the very end. A pressure spring between the pinion gear and the spindle will push the spindle back together with the contraction of the liquid. The ratched gear inside the pinion gear will disconnect the drive from the spindle on the back stroke, so only the down stroke of each expansion valve will drive the big wheel around the side gear. In this fashion a very powerful hydraulic drive is created through a low temperature difference between the inside and outside of the expansion valve. Conventional heat sources are usually in the form of hot or cold water on the bottom of the wheel in which the valve dips. Solar heat can also be used through reflectors on top of the wheel. When nuclear heat elements are installed inside the expansion valve, the entire wheel has to be submerged into water.

Nuclear Heat Expansion valve, the same expansion valves as explained above will have nuclear heat elements installed inside the valve in the form of highly concentrated uranium 235 and plutonium, kept in separate parts. The isotopes are divided through a cadmium plunger which can be pulled in or out of the heat element. The movement of the cadmium stick is controlled through the position of the big wheel, meaning, when in upward position the weight of the cadmium plunger will move down and so neutralize the heat elements. In the upside down position the cadmium plunger will move out of the nuclear heat elements through its own weight and so activate a nuclear reaction which is only introduced for a second or so. Liquid like toluene is a very good moderator in connection with graphite. The benefit of this design is that because of the small amount of heat needed to expand the small amount of liquid, a powerful drive from nuclear direct into mechanical power is achieved without any electronic devices or sophisticated cooling systems. This kind of power conversion needs almost no expertise or service. In this fashion the nuclear power wheel can operate completely on its own. To stop the machine, contact screws on the extreme outside have to be screwed inward, which moves the cadmium stick inward and so stops all reactions. The nuclear power wheel is designed to operate on a permanent speed till the nuclear heat elements are used up, which then can be replaced. The machine, because of its slow motion and heavy mass, is ideal for driving a water pump on the bottom of the ocean in order to harvest precious metal dust and sediments.

To install this machine on the ocean floor, it has to be assembled on land and then put in motion before submergence in the water. The drive of the big wheel has to be disconnected from the pump drive through a clutch with a timing device. The drive from the machine to the pump cannot be engaged until the machine is installed on the ocean floor and the water hose connected to a float on the surface, FIG. 8 (54). Now the clutches can be released and the machine will drive the pump in a continuous manner.

The waterhose, FIG. 8 (45) should be constructed of a flexible material, strong enough to lower the machine into the water and flexible enough to be folded together and upon the drum of a winch during the lowering of the machine to the ocean floor. Air pillows have to be installed around the hose to keep the weight of it up, FIG. 8 (46). Under the pillows, air jets are installed in such a way that they penetrate the hose with a nozzle so that compressed air can be injected in an upward direction, FIG. 9 (45 & 49). Once the machine is in position on the ocean floor, the pump, FIG. 8 (38) will suck up the seawater and mud through a drill and suction stud, FIG. 10 (39-56-58). Hooks under the fundament will give it a better hold in the sand, FIGS. 8 & 10 (44). Wheel covers FIG. 8 (42) will prevent the wheel from getting tangled up with the hose. The massive weight and the steady suction of the pump as well as the digging action of the drill, FIGS. 10 & 11 (56) will lower the machine until solid ground is reached. The machine, with the help of the hose, can be moved to any location.

The Advantage of this Design is, that water, sand and mud can be pumped up from the ocean floor into a boat or onto land. It is known that below the depth of 3000 feet there is very little or no oxygen and therefore almost no plant or micro life possible, so all substances and minerals are dissolved into liquid substance which is loaded with nutritious fertilizer, which is seldom found at higher levels except in case of earthquakes or tidal waves. This substance is unknown to man and could answer the question of creation of ocean life. Since the creation of the earth the seas have scraped the crust of the earth with sand, salt and water and so ground the earthcrust into a fine powder. Corrosion resisting minerals like gold and platinum can be traced in almost any salt water, but as long as the sea water is in motion, these precious metals cannot settle to the floor and if they do, corals and plant life will bury them. Only in the depth of the sea where there is no vegetation or coral life possible and where there is no current, has the precious metal dust been able to settle on the floor over millions of years. Only sand and mud covers it. So far no one has been able to collect these treasures. With the help of the nuclear heat expansion machine, these treasures can be reached without polluting the environment. Of course the exact location has to be discovered through detectors which I have already designed under the name "Digger". With this machine the deepest ocean floor can be explored with all its secrets which is far more profitable and a greater accomplishment than the exploration of space. The nuclear power wheel machine can be built in a matter of months. The location of gold layers could also be detected at about the same time. So giving this project one year and success should be on hand.

INDEX

1. Heat Collector
2. Expansion Cylinder
3. Spindle Drive Cylinder
4. Pinion Gear Stud
5. Pinion Gear
6. Side Gear
7. Sliding Collar
8. Drive Shaft
9. Lock Screw
10. Spring
11. Spindle Bushing
12. Heat Expansion Valve
13. Big Wheel
14. Bearings
15. Stud
16. Drive Gear
17. Sliding Bushing
18. Cadmium Plunger
19. Cadmium Stick
20. Heat Element (Uranium 235)
21. Lead Crystal Glass Shield
22. Air Hose
23. Push Rod
24. Push Rod Joint
25. Key
26. Ratched Gear Pressure Plate
27. Ratched Pins
28. Springs
29. Ratched Teeth
30. Ratched Gear
31. Side Gear
32. Satellite Gear
33. Rubber Cap
34. Spindle Thread Cylinder
35. Pinion Stud Cylinder
36. Lead Crystal Reflector
37. Stopper for Cadmium Stick
38. Water Pump
39. Suction Stud
40. Bottom Plate
41. Nuclear Power Wheel
42. Wheel Guard
43. Suction Channel
44. Anker Brushes
45. Water Hose
46. Air Pillow
47. Air Hose Joint
48. Air Pressure Hose
49. Air Jets
50. Air Jet Stream
51. Air Compressor
52. Water Hose Outlet
53. Float Collar
54. Float
55. Bearing Bushings
56. Drill Head
57. First Drill Extension
58. Second Drill Extension
59. Side Gear
60. Power Drive for Drill
61. Pump Bracket

BRIEF DESCRIPTION OF THE DRAWINGS

FIG. 1 is a partly sectional explanatory view of a power wheel of the machine.

FIG. 2 is a schematic vertical sectional view of the power wheel

FIG. 3 is a schematic vertical view of the heat expansion valve in it's initial contracted state.

FIG. 4 is a schematic vertical sectional view of the pinion gear and spindle drive.

FIG. 5 is a schematic vertical sectional view of the heat expansion valve in its thermally expanded state.

FIG. 6 is a vertical sectional view of the pinion gear joined into two side gears as shown in FIG. 2.

FIG. 7 is a top view of the ratchet gear shown in a vertical sectional view shown in FIG. 6.

FIG. 8 is a plan view of the power wheel in conjunction with a underwater pumping device.

FIG. 9 is a cross section view of air pillows, air jets and water hose.

DETAILED DESCRIPTION OF A PREFERRED EMBODIMENT

Figure 10:
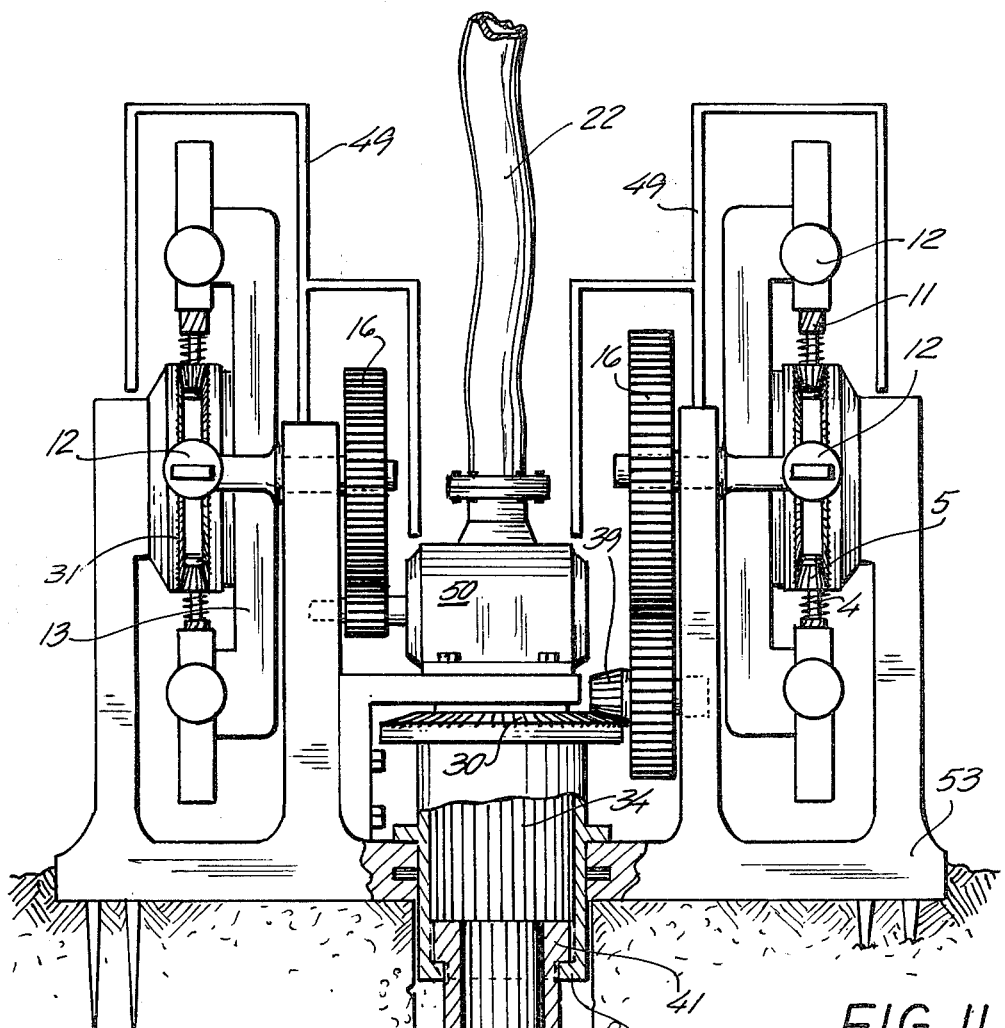
FIG. 10 is a plan view of power wheel in conjunction with a underwater drilling device.
Figure 11:
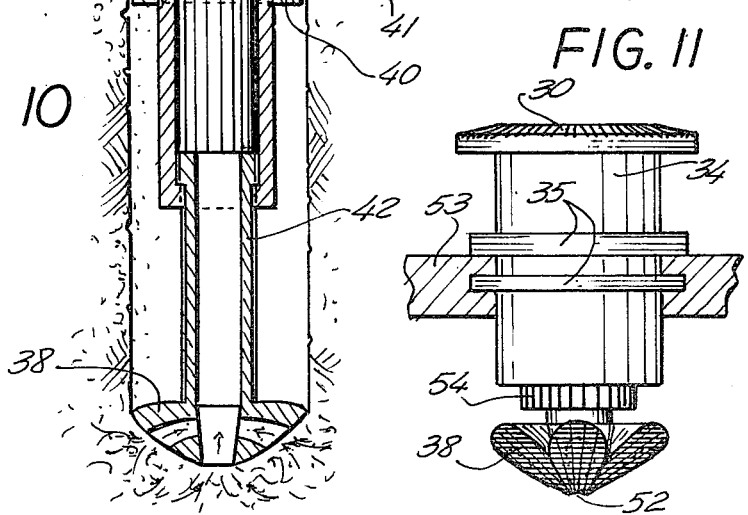
FIG. 11 is a schematic vertical sectional view of the extension drill unit.

Referring to FIGS. 1 and 2 there is shown a power drive of the present invention. Several heat expansion valves are installed around a drive shaft, FIGS. 1 and 2 (8-12) which activates a spindle drive FIG. 1 (11) to turn the big wheel around a side gear, FIG. 2 (13). The movement is accomplished through a hollow cylinder filled with expansible liquid, FIG. 1 (12). At the very end of the valve unit is an opening in which a pushrod is inserted, FIG. 3 (23) the pushrod is sealed tight, fitted with a rubber cap inside the cylinder, FIG. 4 (23-33). When the liquid inside the valve starts to expand or contract, it will move the pushrod in or out. The pushrod is joined against a thrust bearing inside a spindle, FIG. 4 (11-23-24). A pinion gear is inserted into the spindle through a stud. FIG. 4 (4) and a key, FIG. 4 (25) so that the spindle can slide up or down on the stud and turn the pinion gear at the same time, FIG. 4 (4-25-35). Inside the pinion gear is a ratched gear installed. FIGS. 6 & 7 (27-29-76). The ratched gear locks into the spindle drive on the down stroke and disengages on the up stroke, FIG. 6 (26-27-30). A pressure spring is installed between the pinion gear and the drive spindle, FIG. 4 (10). To move the spindle drive upwards into the spindle threat cylinder, FIG. 5 (4-34) together with the contraction of the liquid. The pinion gear consists of three major parts, pinion gear, ratched gear and sliding collar, FIG. 6 (7-29-30). The sliding collar locks the pinion gear against the two side gears, FIG. 6 (7-31-32). One side gear is fastened against the stand, so the pinion gear can drive the big wheel around it. Opposite a second side gear called satellite gear is disconnected are connected to the drive shaft depending on the Design, FIG. 2 (32). Its function is to keep the pinion gear against the side gears, FIG. 6 (5-31-32).

NUCLEAR HEAT EXPANSION VALVE

The difference between the conventional valve and the nuclear, are the nuclear heat elements. The heat elements are made of two parts, one part uranium 235 and one part plutonium, placed around a cadmium plunger, FIG. 3 (18-20). When the valve is in an up position the cadmium stick will fall through its own weight down till the stopper unit on back of the stick hits the flange of the stopper bushing, FIG. 3 (17-37). In this position the nuclear reaction is neutralized, FIG. 3 (18-20). Around the nuclear heat elements is a lead crystal ring, FIG. 3 (21). The function of this is to cover the back surface of the nuclear heat elements against getting hit by neutrons and electrons which are still bouncing within the cylinder. This is made possible by using lead crystal reflector shields, FIG. 3 (21). I discovered that lead crystal glass reflects radioactive rays including neutrons as long as the crystal glass is kept under 1000 Fahrenheit temperature. In this design only a temperature range up to 500° Fahrenheit is introduced and the heat elements are only in introduction of a nuclear reaction. Toluene is not only an excellent heat transmitter but also an expansible liquid and moderator. The moderation can be intensified through graphite. As soon as the cadmium plunger neutralizes the nuclear reaction, some neutrons will still be active from the previous nuclear reaction made possible by reflecting the neutrons from one crystal lead reflector to the other. As soon as the big wheel turns and the nuclear heat expansion valve stands upside down, the weight of the cadmium stick will pull the cadmium plunger out of the nuclear heat elements, FIG. 5 (18-20-37). Now a nuclear reaction is introduced which will immediately take place because of the large amount of neutrons and electrons still in circulation from the last reaction. In this fashion a very efficient and safe nuclear via mechanical conversion is accomplished without any electronic controls or sophisticated cooling system. As soon as the machine is in motion, it will adopt itself to a permanent speed till the nuclear heat elements are exhausted. To stop the machine, lock screws are placed on the outside, FIG. 3 (9), which are screwed inwards. The cadmium stick will automatically move inward and stop all nuclear actions. Such a machine can produce power of sufficient amounts. A wheel of ten feet in diameter with eight nuclear expansion valves, operating at an 80° Fahrenheit temperature difference, can produce approximately 700 kilowatt an hour which is ideal for consumers, such as farmers, homeowners, factories and businesses, also in remote areas as army bases, but more important underwater explorations and mining, regardless of the depth and pressure. The nuclear power wheel can operate publicly to demonstrate how nuclear energy can be converted into a useful power with absolutely no danger factor involved and, which is also important, free of polluting the environment.

This knowledge is very important to the public particularly since I discovered that nuclear waste material, meaning high radioactive material, can be converted into a useful energy in a patent application called Weinert Light Electrons Amplifier. I believe that nuclear waste material will in the near future be just as much in demand as nuclear fuel.

The advantage of having two different isotopes used as heat elements, is to have more intense radio activity which allows a smaller amount of nuclear mass. In conjunction with the crystal reflectors a much faster nuclear reaction is introduced. The Nuclear cells can also operate only one plutonium which means Nuclear waste can be used as Nuclear Fuel.

I claim:

1. A nuclear power wheel comprising
   a stationary side gear having a central substantially horizontal axis and mounted on a frame means,
   a shaft having first and second ends, said shaft being mounted on said axis,
   means for rotating said shaft solely in one direction,
   a satellite gear fixed to said first end of said shaft,
   a wheel fixedly mounted between the first and second ends of said shaft, said wheel having an outer perimeter,
   a plurality of expansion valves mounted on said outer perimeter on radial axes, each of said expansion valves including
   a nuclear heat element,
   an expandable fluid,
   a pushrod,
   a rotating spindle bushing joined to said pushrod,
   a pinion gear joined to said spindle bushing, said pinion gear intermeshing with said stationary side gear and said satellite gear,
   a drive gear for delivering useful work output mounted on the second end of said shaft,
   wherein when one of said plurality of expansion valves is at the lowest vertical point of said wheel, said nuclear heat element causes the fluid to to expand by means of nuclear reactions, and when one of said plurality of expansion valves is at the highest vertical point of said wheel, said nuclear heat element causes said fluid to contract by substantial absence of nuclear reactions; thereby effecting reciprocatory motion of the pushrods which in turn effect rotary motion of said pinion gear, said satellite gear and said drive gear.

2. The nuclear power wheel of claim 1 wherein the nuclear heat element includes two fixed distinct masses of uranium-235, and a freely moveable cadmium means which is moveable solely by means of gravity which separates said two masses when inserted therebetween at the uppermost vertical point of the wheel and which is completely withdrawn at the lowermost vertical point of the wheel.

3. The nuclear power wheel of claim 1 wherein the frame means is secured to the sea floor and the drive gear is joined to a plural section drill means.

4. The nuclear power wheel of claim 3 including a hose extending from the sea floor to a sea surface means, said sea surface means having an air compressor means which injects air in at least one point in said hose in an upwardly flowing direction to assist in the movement of the contents of said hose.

* * * * *